US011420700B2

(12) United States Patent
Skinner

(10) Patent No.: US 11,420,700 B2
(45) Date of Patent: Aug. 23, 2022

(54) MOTORCYCLE WIND BUFFETING SHIELD

(71) Applicant: Wichita State University, Wichita, KS (US)

(72) Inventor: Steven Skinner, Wichita, KS (US)

(73) Assignee: Wichita State University, Wichita, KS (US)

( * ) Notice: Subject to any disclaimer, the term of this patent is extended or adjusted under 35 U.S.C. 154(b) by 0 days.

(21) Appl. No.: 17/148,841

(22) Filed: Jan. 14, 2021

(65) Prior Publication Data

US 2021/0214034 A1 Jul. 15, 2021

Related U.S. Application Data

(60) Provisional application No. 62/960,918, filed on Jan. 14, 2020.

(51) Int. Cl.
*B62J 17/10* (2020.01)

(52) U.S. Cl.
CPC .................................... *B62J 17/10* (2020.02)

(58) Field of Classification Search
CPC ... B62J 17/00; B62J 17/10; B62J 17/04; B62J 17/06; B62J 17/065; B62J 23/00
USPC .................................... 296/180.1, 78.1, 84.1
See application file for complete search history.

(56) References Cited

U.S. PATENT DOCUMENTS 6,237,982 B1 * 5/2001 Abe ........................ B62J 17/10 296/78.1
7,178,858 B1 * 2/2007 Hesse ...................... B62J 17/06 296/180.1
8,256,022 B2 * 9/2012 Bigalke .................. A41D 13/00 2/62
2005/0088850 A1 * 4/2005 Miller .................... B60Q 1/268 362/503

FOREIGN PATENT DOCUMENTS

JP H0769262 A * 3/1995

OTHER PUBLICATIONS

Big Bike Parts, 52-665U—Upper Side Wind Deflect Smoke, 2011 (Year: 2011).*
Honda, GL-1800 2010 Owner's Manual Cover Page, https://www.acura.com/assets/ownerlink-temp/ownerlink/model/own_man/powersports/motorcycle/2010/10_gl1800.pdf (Year: 2010).*
Big Bike Parts, 52-665U Installation Instruction, 2011 (Year: 2011).*
Ajitanshu Vedrtnam, S.J. Pawar. "Laminated plate theories and fracture of laminated glass plate—A review". 2017 (Year: 2017).*

* cited by examiner

*Primary Examiner* — Jason S Morrow
*Assistant Examiner* — Wenwei Zhuo
(74) *Attorney, Agent, or Firm* — Hovey Williams LLP

(57) ABSTRACT

A vehicle wind buffeting shield, a vehicle incorporating a wind buffeting shield, and a method of diverting upward air flow during operation of a vehicle using a wind buffeting shield are provided. The wind buffeting shield includes a flow restricting portion and at least one mounting member. The at least one mounting member couples the flow restricting portion proximate a bottom portion of a gas tank of a vehicle such that the flow restricting portion projects generally horizontal and outwards from the vehicle and restricts upward air flow during operation of the vehicle.

18 Claims, 8 Drawing Sheets

10 24 26 40 46 36 42 38 20 44 37 28 30 12 14

418
436
426
440
437
439
424
438
410

MOTORCYCLE WIND BUFFETING SHIELD

CROSS-REFERENCE TO RELATED APPLICATION

This nonprovisional application claims the benefit of priority to U.S. Provisional Application No. 62/960,918, filed Jan. 14, 2020, and titled "MOTORCYCLE WIND BUFFETING SHIELD," which is incorporated by reference herein in its entirety.

TECHNICAL FIELD

The present disclosure generally relates to components and accessories for a motorcycle. More particularly, aspects of this disclosure relate to a motorcycle wind buffeting shield.

BACKGROUND OF THE DISCLOSURE

As motorcycles, trikes and other three-wheel vehicles, all-terrain vehicles (ATVs), and similar vehicles become more popular for recreational and commuting use, there have been many improvements in the area of rider comfort including better suspension, heated or cooled seats, windshields, cruise control, and other features. Nonetheless, certain of these features come with their own drawbacks. For example, while windshields are effective at diverting a sustained headwind from a rider's head and upper torso, they have the drawback of creating a vacuum pocket around the rider into which upward flowing air is drawn, which can lead to wind buffeting and thus decreased rider comfort. There thus remains a need for improved rider comfort technologies without the current drawbacks of known windshields and the like.

SUMMARY OF THE DISCLOSURE

Some embodiments of the present disclosure are directed to a motorcycle or similar vehicle wind buffeting shield that restricts upward air flow from reaching a rider's upper body and head area, thus reducing or eliminating the wind buffeting associated with using a typical windshield or the like. Other embodiments of the present disclosure are directed to motorcycles or similar vehicles employing such wind buffeting shields, and methods of using similar wind buffeting shields.

For example, some embodiments of this disclosure are directed to a vehicle wind buffeting shield that includes an air flow restricting portion and at least one mounting member. The at least one mounting member is configured to couple the air flow restricting portion proximate a bottom portion of a gas tank of a vehicle such that the flow restricting portion projects generally horizontal and outwards from the vehicle and restricts upward air flow during operation of the vehicle.

Other embodiments of this disclosure are directed to a vehicle including a main frame, a gas tank mounted to the main frame, a front fork pivotably coupled to the main frame and including a pair of handlebars and a windshield coupled thereto, and a wind buffeting shield such as the wind buffeting shield described above, coupled to and extending between a rigid component of the vehicle and the gas tank.

Still other embodiments of this disclosure are directed to a method of diverting upward air flow during operation of a vehicle. The method includes mounting a wind buffeting shield, such as the one described above, on a vehicle by coupling the front coupling portion to a rigid component of the vehicle and coupling the rear coupling portion to the gas tank.

Additional advantages and features of the present disclosure will be set forth in part in a description which follows, and in part will become apparent to those skilled in the art upon examination of the following or may be learned from practice of the disclosure.

BRIEF DESCRIPTION OF THE DRAWINGS

The present disclosure is described in detail below with reference to the attached drawing figures, in which like numerals represent the same components, and wherein.

DETAILED DESCRIPTION

Figure 1:
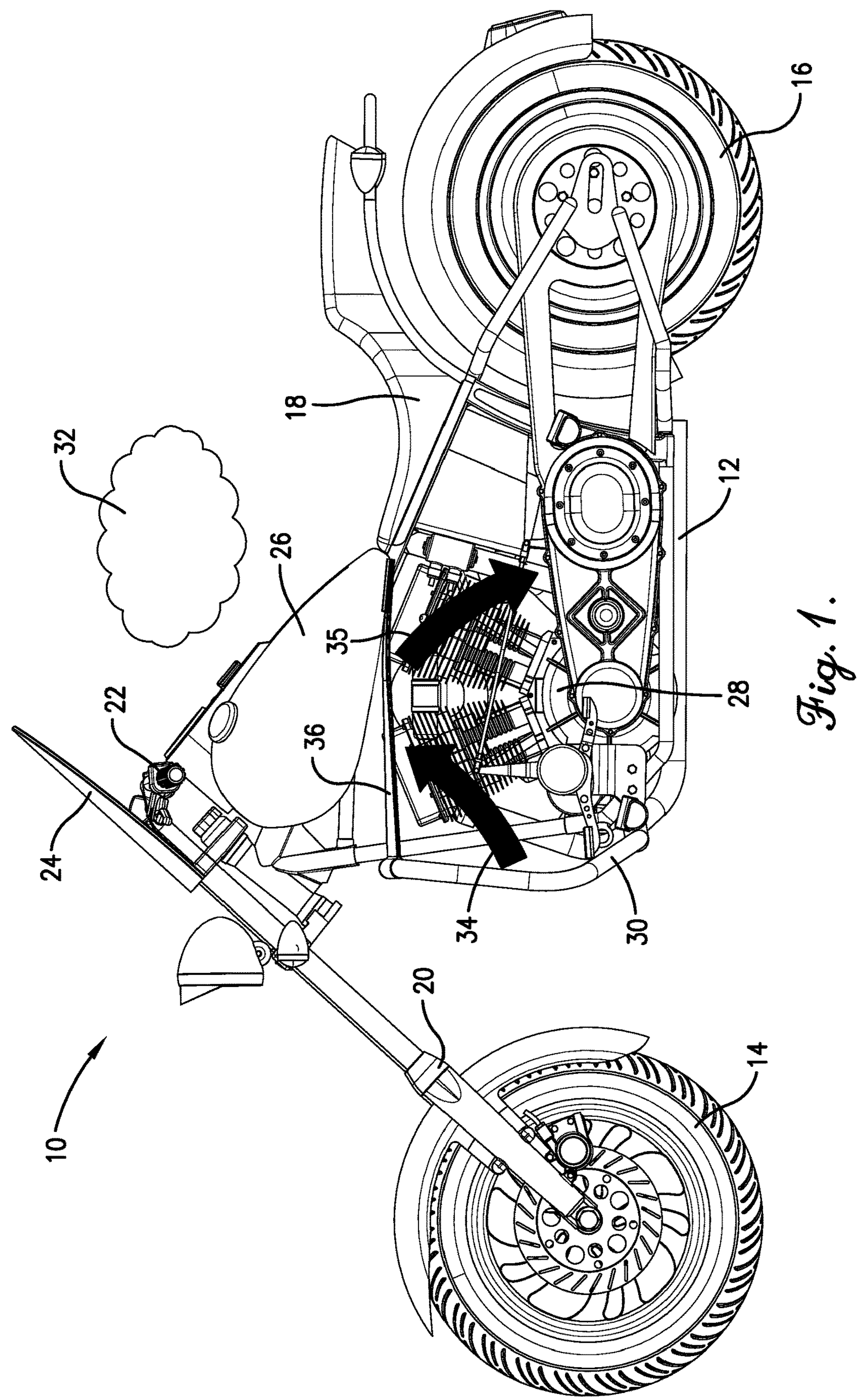
FIG. 1 is a left-side elevation view of a motorcycle outfitted with a wind buffeting shield according to aspects of this disclosure.

FIG. 1 shows a motorcycle 10 outfitted with a wind buffeting shield 36 according to aspects of this disclosure. Although the various aspects of the disclosure will be discussed in connection with a motorcycle 10 (i.e., a two-wheeled vehicle) for convenience, the disclosure is not so limited and in other embodiments the wind buffeting shield 36 could be employed on other types of vehicles without departing from the scope of the disclosure including, without limitation, a trike or other three-wheeled vehicle, an ATV such as a four-wheeler or similar, or other vehicle.

The motorcycle 10 generally includes an upstanding frame 12 supporting a front fork 20 rotatably coupled at one end to a front wheel 14 and to a pair of handlebars 22 at the opposing end, a back wheel 16, a rider seat 18, a windshield 24 mounted to the front fork 20 proximate the handlebars 22 and extending upwards therefrom, a gas tank 26 disposed between the handlebars 22 and the rider seat 18, and an engine 28 located generally below the gas tank 26. In some embodiments, the motorcycle 10 may include a frame member projecting outwardly from both sides of the motorcycle 10 near a front portion thereof, such as an engine guard 30 projecting outwards from the frame 12 near the engine 28 on either side of the motorcycle 10. The engine guard 30 engages the pavement or other surface if the motorcycle 10 is tipped over in order to protect the engine 28, frame 12, and other components of the motorcycle 10 from damage.

During use a rider sits on the rider seat 18 with their legs straddling the motorcycle 10 and with their inner thighs proximate the gas tank 26. The rider grasps the handlebars 22 and steers the motorcycle 10 by leaning the motorcycle 10 from side to side and/or by pivoting the handlebars 22 and thus turning the fork 20 and front wheel 14 coupled thereto. The rider controls a hand-operated throttle, brake, and clutch lever mounted to the handlebars 22, and a foot brake and gear shift lever mounted near the right and left footrests of the motorcycle 10, respectively.

When the motorcycle 10 is outfitted with the windshield 24, the windshield 24 diverts headwinds from the area where the rider sits, providing a less harsh riding environment. However, by diverting the air in such a manner, the windshield 24 creates a vacuum pocket 32 near the rider's head, which is schematically shown in FIG. 1. Unabated, this vacuum pocket 32 causes air to flow rapidly upwards from the ground to fill the pocket 32, as schematically illustrated by air flow arrow 34. This rapid, upward air flow 34 can cause wind buffeting and other rider discomfort. Thus, without the benefit of the present disclosure, a rider faces an undesirable choice: omit the windshield 24 resulting in a harsh ride due to strong headwinds directly contacting the rider's face and upper body, or else include the windshield 24 in an effort to divert the headwinds, which may result in wind buffeting and other discomfort due to generally upward air flow 34 filling the windshield 24's vacuum pocket 32.

Aspects of this disclosure are directed to a motorcycle wind buffeting shield that reduces or eliminates wind buffeting and other rider discomforts even when the rider is using a windshield 24 or other component that creates a vacuum pocket and thus wind buffeting. Although embodiments of the disclosure described herein are discussed in connection with a motorcycle 10 including the windshield 24, in other embodiments the wind buffeting shield 36 can be implemented on a motorcycle that does not include the windshield 24 without departing from the scope of the disclosure. For example, the wind buffeting shield 36 may be implemented to reduce or eliminate buffeting caused by a vacuum pocket formed behind other motorcycle components such as fairings, handlebars, gas tanks, mirrors, fenders, and others. Embodiments of this disclosure reduce or eliminate wind buffeting by generally restricting or blocking upward airflow 34 from rushing into the vacuum pocket 32 formed behind the windshield 24 or other motorcycle component, near the rider's head.

More particularly, and as schematically illustrated in FIG. 1, the wind buffeting shield 36 extends generally horizontally and outwardly from one or both sides of the motorcycle 10 proximate an underneath side of the gas tank 26, which restricts or blocks upward air flow 34 from entering the rider's area. The upward air flow 34 is diverted downward and away from the rider as schematically shown by the air flow arrow 35. Thus, the wind buffeting shield 36 restricts or blocks upward air flow 34 from entering a vacuum pocket 32 formed as a result of the diverted headwind by the windshield 24 or other motorcycle component during operation of the motorcycle 10.

Figure 2:
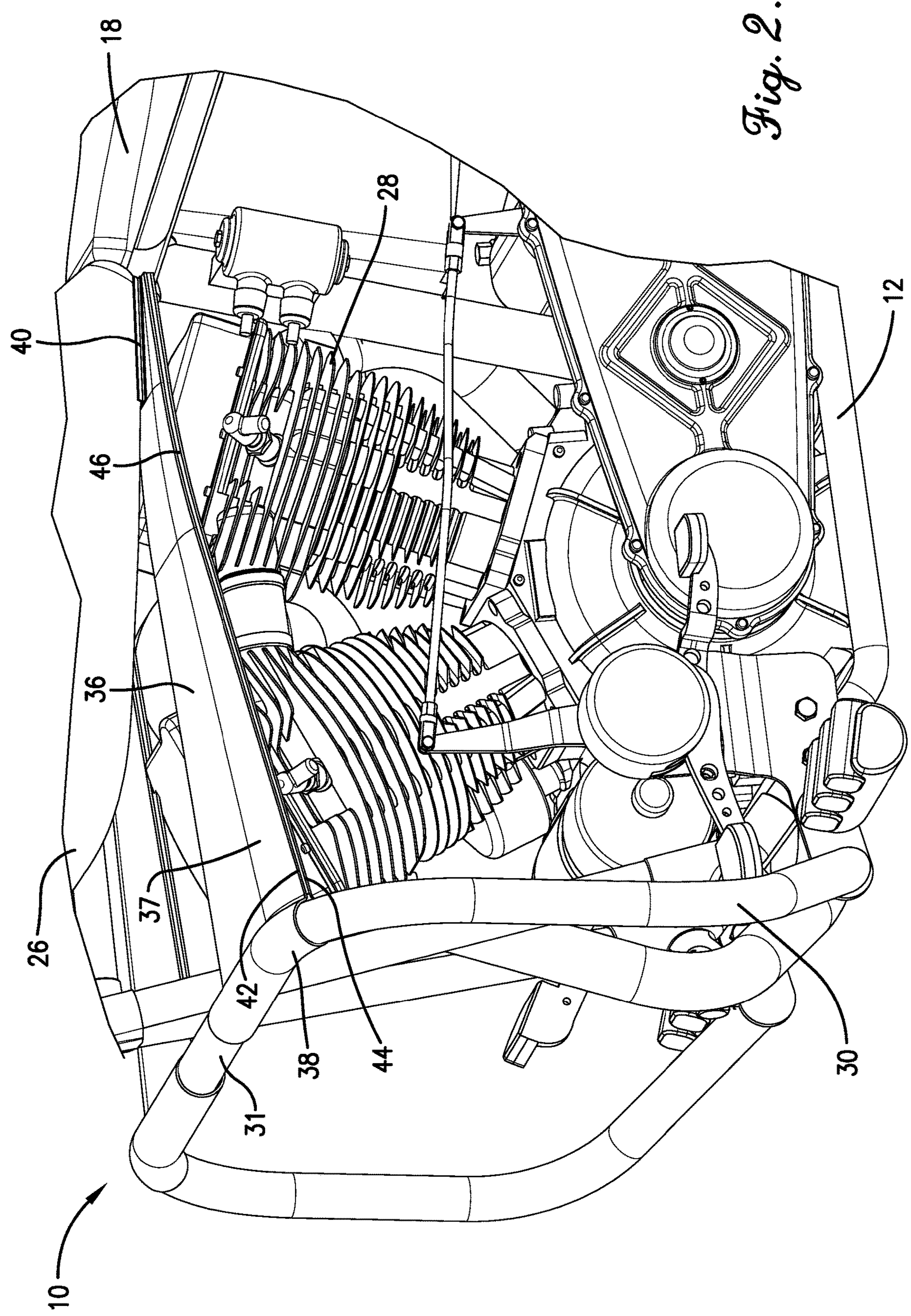
FIG. 2 is a partial front, left perspective view of the motorcycle shown in FIG. 1.
Figure 3:
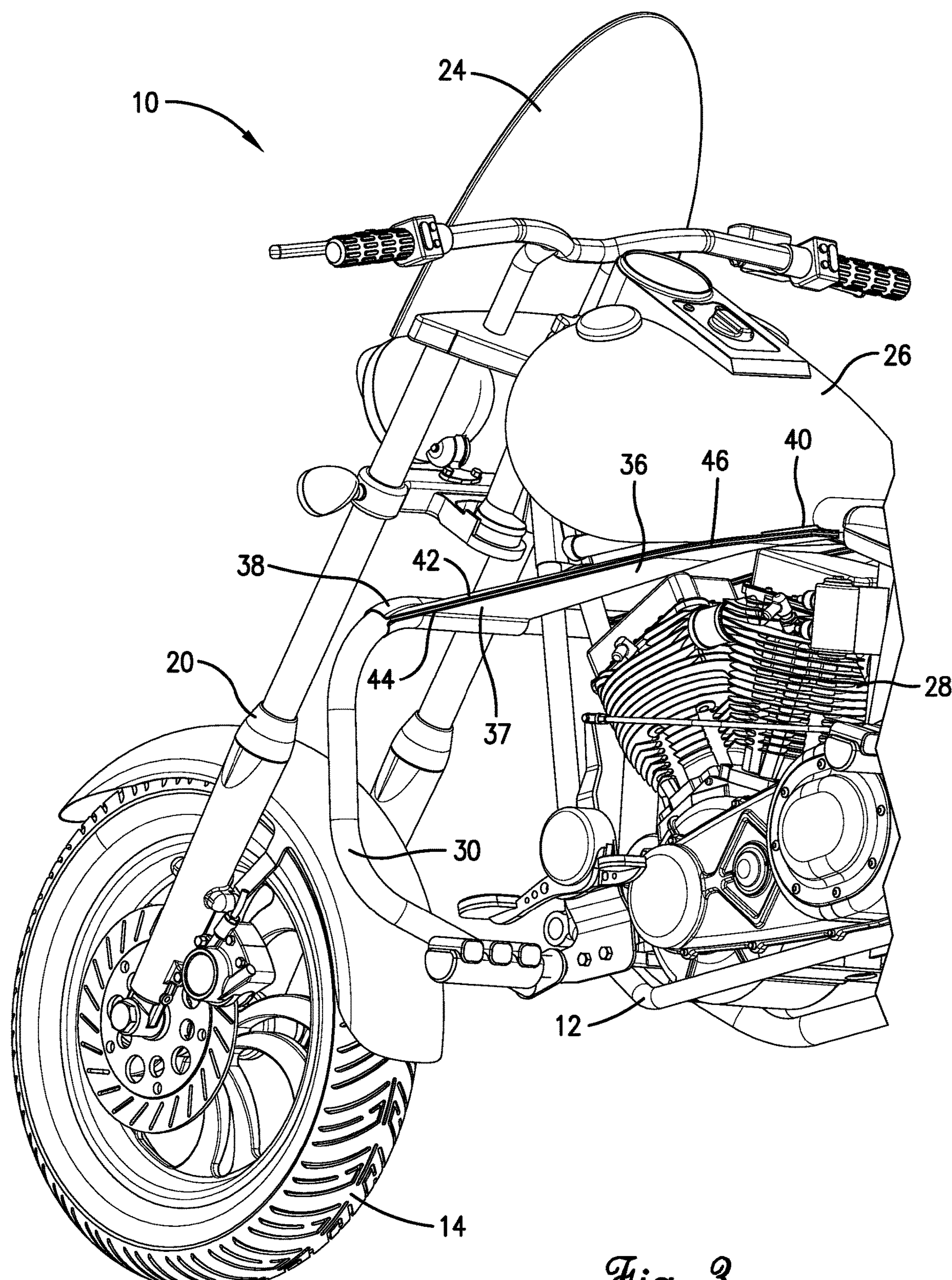
FIG. 3 is a partial back, left perspective view of the motorcycle shown in FIGS. 1-2.
Figure 4:
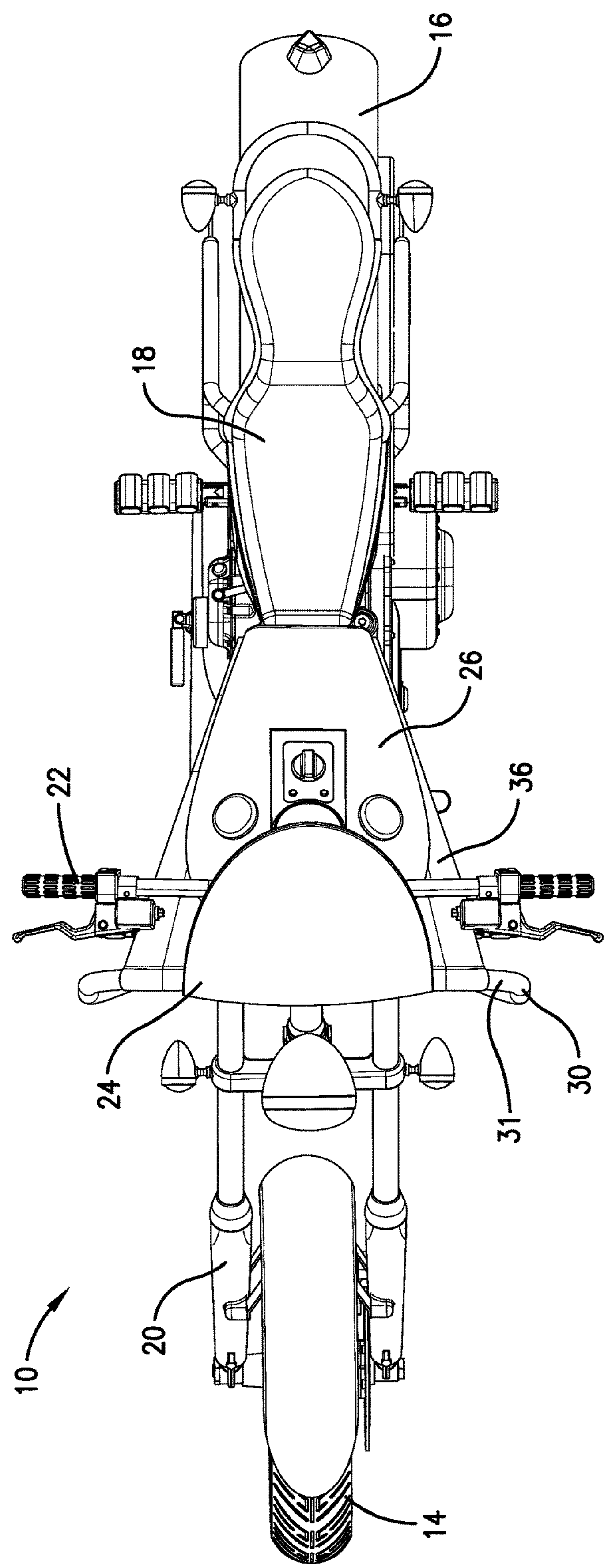
FIG. 4 is a top view of the motorcycle shown in FIGS. 1-3.

FIGS. 2-4 show the first embodiment of the wind buffeting shield 36 in greater detail. As best seen in FIG. 2 or 4, in the depicted embodiment, the wind buffeting shield 36 is generally triangular in plan view, with a base thereof provided at the engine guard 30, and with two elongated sides extending generally rearward towards a back of the gas tank 26 joining at a vertex. Although the wind buffeting shield 36 is depicted as being generally triangular in plan view, in other embodiments the wind buffeting shield 36 may be any desired shape such as, e.g., rectangular, semi-circular, having a rounded or arcuate outer perimeter, etc., without departing from the scope of this disclosure, as will be discussed more fully below in connection with FIGS. 5-8. Moreover, in some embodiments the motorcycle 10 may include two wind buffeting shields 36, one on each side of the motorcycle 10. Because in such embodiments the wind buffeting shields 36 are mirror images of one another, each wind buffeting shield 36 is depicted using like numerals for like components, and the wind buffeting shield 36 is discussed in the singular herein for ease of discussion.

The wind buffeting shield 36 is generally horizontally extending—that is, the wind buffeting shield is generally planar and extending in a direction substantially parallel to the ground when the motorcycle 10 is standing upright. In other embodiments the wind buffeting shield 36 may extend in other directions such as, for example, at an oblique angle with respect to the ground when the motorcycle 10 is standing upright without departing from the scope of the disclosure.

Figure 8:
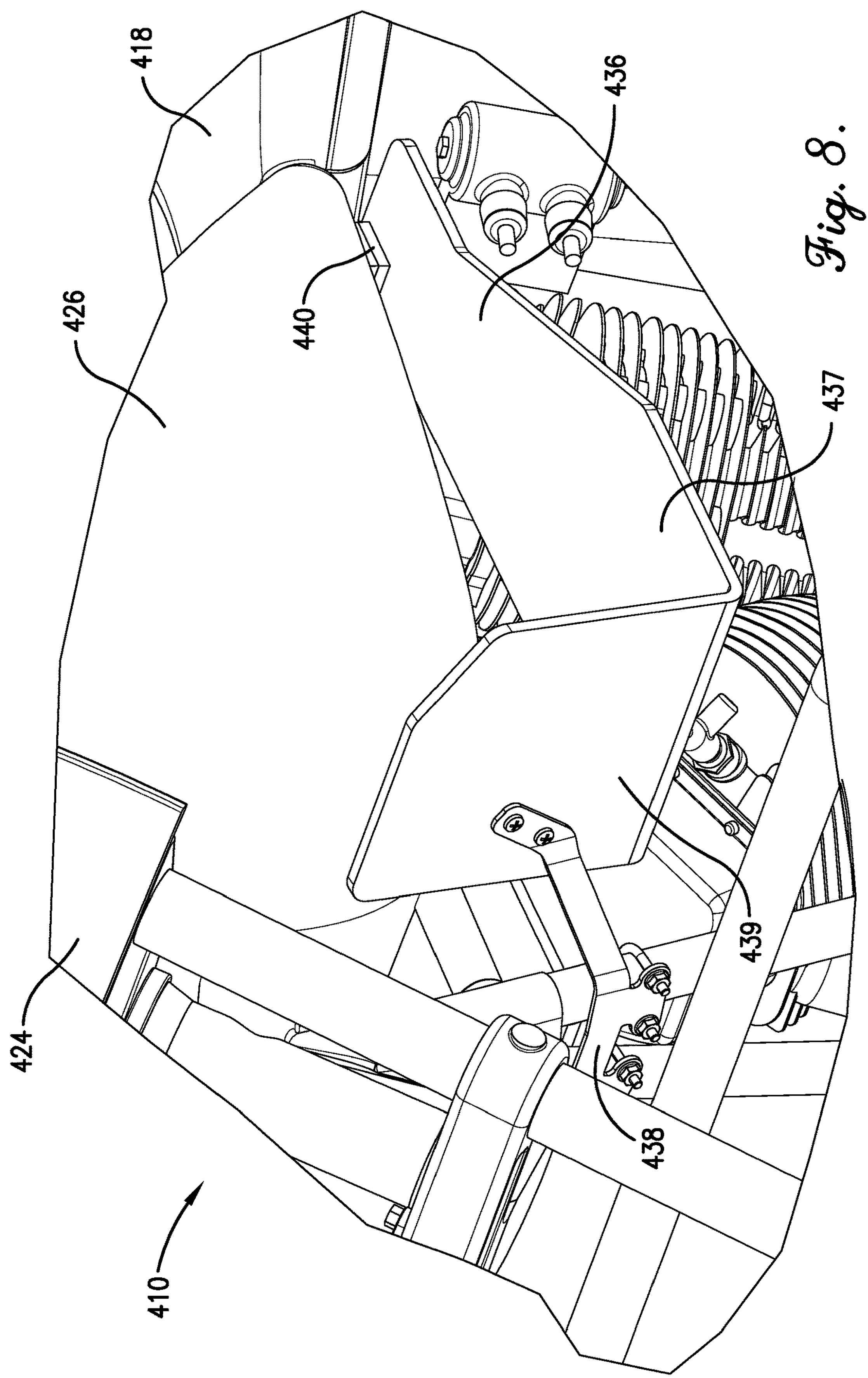
FIG. 8 is a partial front, left perspective view of a motorcycle outfitted with yet another embodiment of a wind buffeting shield according to aspects of this disclosure.

The wind buffeting shield 36 generally includes a front coupling portion 38 engaging a generally horizontally extending frame member of the motorcycle 10. In the depicted embodiment the front coupling portion 38 engages a horizontal extending bar 31 of the engine guard 30. In other embodiments, however, the front coupling portion 38 may engage another frame member without departing from the scope of this disclosure, as best seen in FIG. 8, discussed below. For example, in embodiments where the motorcycle 10 is not equipped with an engine guard 30, the motorcycle 10 may include a single horizontally extending bar (not shown) mounted to the front of the frame 12, and the front coupling portion 38 may in turn couple to the horizontal bar. The front coupling portion 38 may couple to any other suitable frame member without departing from the scope of this disclosure.

Moreover, in embodiments where the wind buffeting shield 36 is constructed from a rigid material, the front coupling portion 38 may include a fastener or other member that mounts directly to a rigid component of the motorcycle frame or similar. For example, the front coupling portion 38 may include a mounting bracket that couples directly to the frame 12 with the rigid body projecting outwards therefrom, and thus in such embodiments and/or horizontal frame member 31 may be omitted.

In the depicted the embodiment, the wind buffeting shield 36 also includes a rear coupling portion 40 engaging the tank 26, a tank mount, or other frame 12 component located near a rear of the gas tank 26. In some embodiments, the rear coupling portion 40 may include a fastening material (as best seen in FIGS. 2-3) such as a hook-and-loop fastening material that interlocks with a corresponding hook-and-loop fastening material affixed to a rear, underneath side of the gas tank 26. Thus, the rear coupling portion 40 is removably fixed in place simply by pressing the rear coupling portion 40 against the tank 26. In other embodiments, the rear coupling portion 40 may include a grommet, clip, hook, magnet, or similar mechanism that engages the gas tank 26, a gas tank mount, or similar, thus securing the rear mounting portion 40 in place. In still other embodiments, the rear coupling portion 40 may include a strap or similar member, such as a nylon strap, that is stretched about the tank 26, frame 12, seat 18, tank mount, or similar member in order to hold the wind buffeting shield 36 in place.

Finally, the wind buffeting shield 36 includes a generally horizontally extending flow restricting portion 37 stretching and extending between the front coupling portion 38 and the rear coupling portion 40. Again, while the depicted flow restricting portion 37 is triangular in plan view, in other embodiments the flow restricting portion 37 may take another desired shape such as semicircular, rectangular, irregular polygon, or other shape without departing from the scope of this disclosure, which will be discussed below in connection with FIGS. 5-8.

During use, the flow restricting portion 37 projects into a flow path of the upward air flow 34. More particularly, the wind buffeting shield 36 is secured in a position projecting generally horizontally outwards from one or both sides of the motorcycle 10 via a mount or coupling portion (such as, e.g., the front coupling portion 38, the rear coupling portion 40, a side mount (not shown), etc.) firmly engaging the engine guard 30, the frame 12, the gas tank 26, the seat 18, or another component. The flow restricting portion 37 outstretches and interrupts (thus restricting or blocking) upward air flow 34, as schematically shown by the deflected air flow arrow 35 in FIG. 1. As discussed, this reduces or eliminates the wind buffeting attendant to the use of the windshield 24 due to the vacuum pocket 32 formed by high winds contacting the windshield 24.

The wind buffeting shield 36 may be constructed from any suitable material. For example, in some embodiments, the wind buffeting shield 36 is constructed from a durable textile such as vinyl fabric or the like. In other embodiments, the wind buffeting shield 36 is constructed from leather or a flexible plastic. In alternative embodiments, the wind buffeting shield 36 is rigidly constructed. For example, the wind buffeting shield may be formed (e.g., injection molded or similar) from a rigid plastic, plexiglass, or similar material without departing from the scope of this disclosure. Again, when rigidly formed the wind buffeting shield may not include the front coupling portion 38 and/or the rear coupling portion 40.

For example, in some embodiments the wind buffeting shield 36 may be rigidly formed from plastic, plexiglass, or similar and may have a front coupling portion or side coupling portion (not shown) that mounts directly to the fame 12 or a component thereof near the underneath side of the gas tank 26. In such embodiments, the wind buffeting shield 26 may rigidly project outwardly from the front or side mount, and thus the horizontal frame member 31 and/or the rear coupling portion 40 may be eliminated altogether without departing from the scope of this disclosure.

In the embodiment depicted in FIGS. 1-4, the wind buffeting shield 36 is formed from a flexible material. Such flexible material can be, but is not limited to, leather, vinyl fabric, flexible plastic, or similar. Moreover, the wind buffeting shield 36 may comprise a plurality of layers of the flexible material. For example, in the depicted embodiment the flow restricting portion 37 of the wind buffeting shield 36 includes two layers 42, 44 of a flexible, durable material.

In such embodiments, the wind buffeting shield 36 may be constructed from a single, integral piece of durable material and then folded generally in half to create the dual layer 42, 44 configuration. In such embodiments, the wind buffeting shield 36 is generally wrapped around the horizontal extending bar 31 of the engine guard 30 (or other horizontally extending frame member, when equipped) such that the bar 31/frame member is sandwiched between the top layer 42 and the bottom layer 44 of the wind buffeting shield 36, forming the front coupling portion 38. Then, the layers 42, 44 are generally aligned and pressed together rearward of the bar 31, with both layers 42, 44 being disposed generally proximate one another in the flow restricting portion 37 and the rear coupling portion 40.

In some embodiments the top layer 42 and/or the bottom layer 44 may include a fastening material 46 to releasably couple the top layer 42 to the bottom layer 44 in the flow restricting portion 37, thereby causing the portion of the wind buffeting shield 36 that is wrapped about the horizontally extending bar 31—that is, the front coupling portion 38 of the wind buffeting shield 36—to engage the bar 31 in a non-slip manner such that the wind buffeting shield 36 is held firmly in place with respect to the bar 31 during use. In some embodiments, the fastening material 46 may include a hook-and-loop fastening material, however other types of fastening material and/or fasteners such as buttons, zippers, and others may be employed without departing from the scope of this disclosure.

For example, in one embodiment the wind buffeting shield 36 may include one or more zippers proximate one or more edges of the flow restricting portion, with the zippers being closed after the wind buffeting shield 36 is wrapped about the horizontally extending bar 31. Or the wind buffeting shield 36 may include a horizontally extending zipper in the front coupling portion 38—that is, a zipper extending generally parallel to the horizontal extending bar 31 of the engine guard 30—and thus is secured to the engine guard 30 or other member by placing the top and bottom layer 42, 44 around the engine guard 30 sandwiching the horizontal extending bar 31 therebetween and closing the zipper to secure the wind buffeting shield 36 in place. After the first and second layers 42, 44 are generally aligned and/or coupled to one another, the rear coupling portion 40 is fastened to the tank 26 or the frame 12 by, for example, pressing a portion of the wind buffeting shield 36 containing a hook-and-loop material against a corresponding hook-and-loop material provided on the tank 26, frame 12, or similar, as discussed.

Again, in other embodiments the wind buffeting shield may have a different configuration in plan view than the triangular configuration shown in FIGS. 1-4. For example, FIGS. 5-8 show alternative configurations of wind buffeting shields 136, 236, 336, 436 as non-limiting example configurations of alternative embodiments that are contemplated within the scope of the disclosure.

More particularly, FIGS. 5-8 show motorcycles 110, 210, 310, 410 employing example embodiments of wind buffeting shields 136, 236, 336, 436 according to aspects of the disclosure. Again, although the wind buffeting shields 136, 236, 336, 436 in FIGS. 5-8 are discussed in connection with a motorcycle 110, 210, 310, 410 (i.e., a two-wheeled vehicle) for convenience, the disclosure is not so limited and in other embodiments the wind buffeting shields 136, 236, 336, 436 could be employed on other types of vehicles without departing from the scope of the disclosure including, without limitation, a trike or other three-wheeled vehicle, an ATV such as a four-wheeler or similar, or other vehicle.

The motorcycles 110, 210, 310, 410 are similar to motorcycle 10 in that they generally include an upstanding frame supporting a front wheel 114, 214, 314, back wheel 116, 216, 316, seat 118, 218, 318, 418, front fork 120, 220, 320, handlebars 122, 222, 322, windshield 124, 224, 324, 424, gas tank 126, 226, 326, 426, engine, and an engine guard 130, 230, 330 including a horizontal extending bar 131, 231, 331 thereof. Each of these components is similar in configuration and function to the like-named components of motorcycle 10, and thus will not be discussed again in detail.

The motorcycles 110, 210, 310, 410 shown in FIGS. 5-8 are each equipped with a wind buffeting shield 136, 236, 336, 436 that is configured and functions in a similar manner to the wind buffeting shield 36 of motorcycle 10. That is, at least a portion of each wind buffeting shield 136, 236, 336, 436 extends generally horizontally proximate a bottom of the respective gas tank 126, 226, 326, 426 thereby blocking an upward airflow (such as airflow 34 shown in FIG. 1) and reducing or eliminating the associated wind buffeting to a rider's upper body during use. However, the wind buffeting shields 136, 236, 336, 436 each have a different shape and configuration, thereby providing different wind shielding properties and aesthetic appearances.

Figure 5:
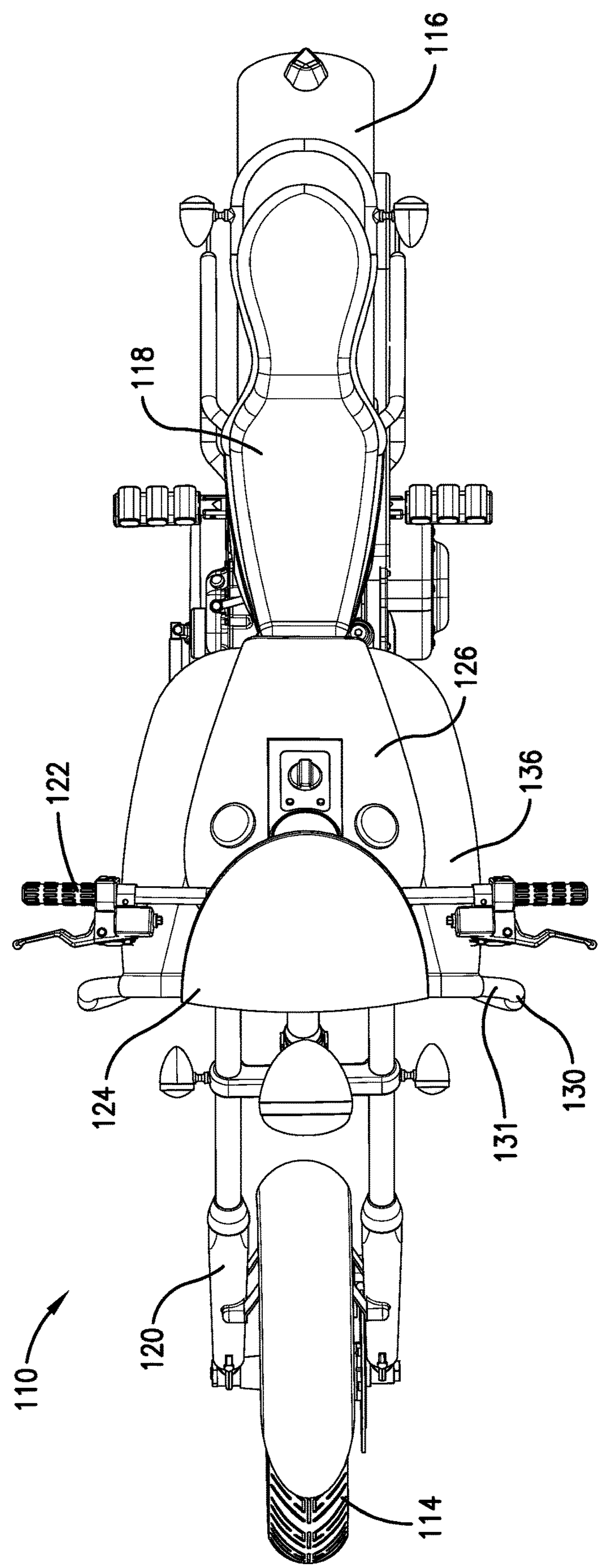
FIG. 5 is a top view a motorcycle outfitted with another embodiment of a wind buffeting shield according to aspects of this disclosure.
Figure 6:
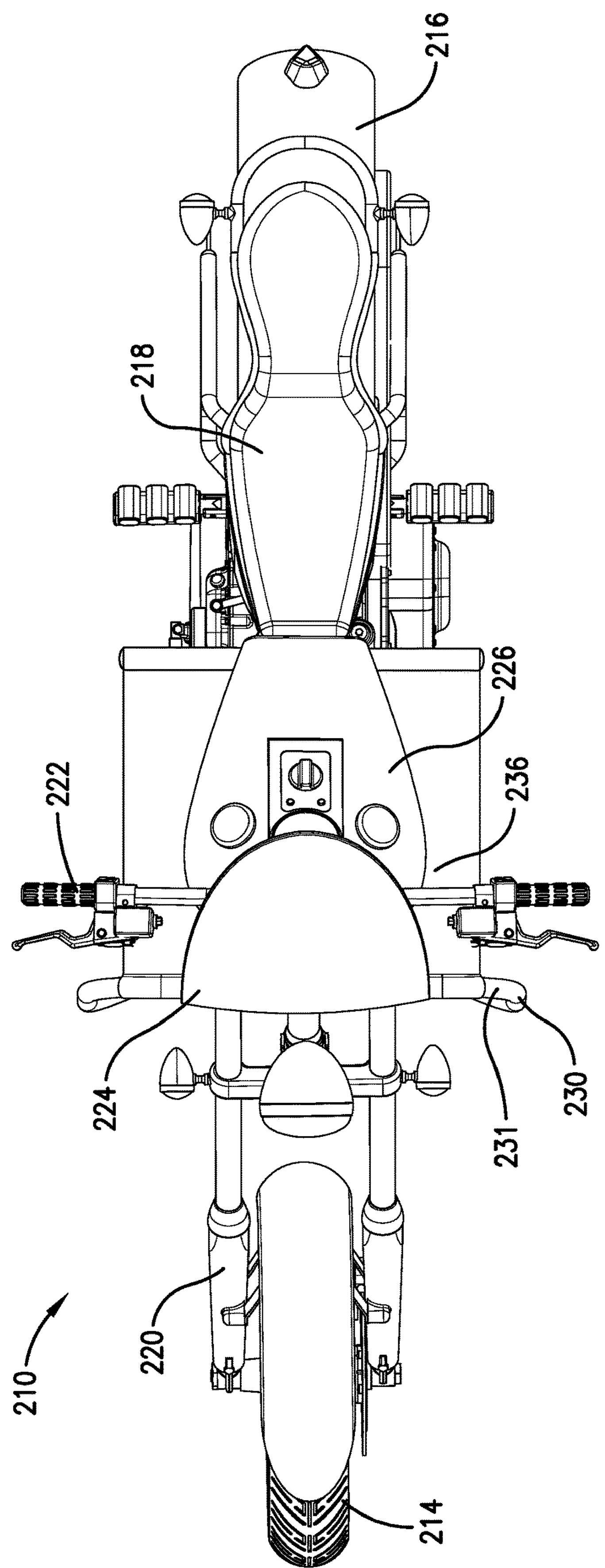
FIG. 6 is a top view a motorcycle outfitted with yet another embodiment of a wind buffeting shield according to aspects of this disclosure.
Figure 7:
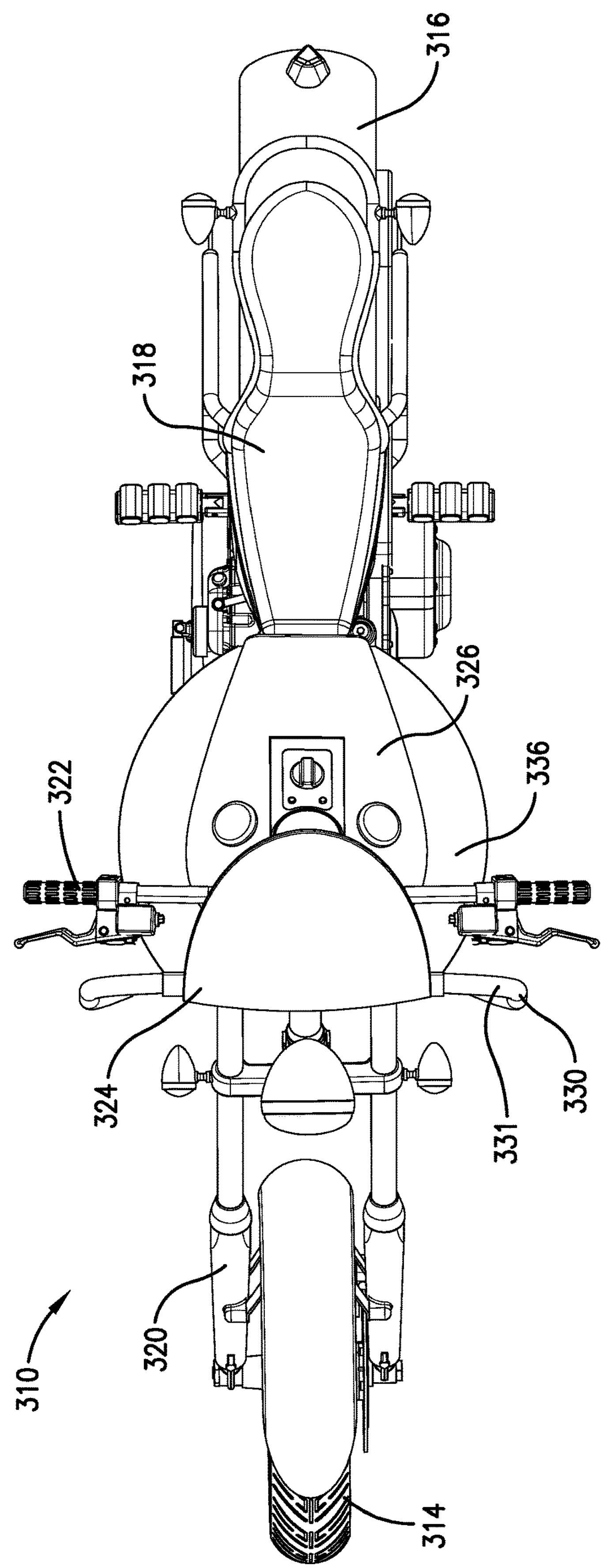
FIG. 7 is a top view a motorcycle outfitted with yet another embodiment of a wind buffeting shield according to aspects of this disclosure.

First, the wind buffeting shield 136 shown in FIG. 5 has a generally arcuate outer perimeter. In some embodiments, when the wind buffeting shield 126 is constructed from a flexible material, the wind buffeting shield 126 may include an internal wire, frame, or other rigid or semi-rigid member to maintain the shape shown in FIG. 5 during use. For example, a wire or other member may run along the arcuate outside perimeter to maintain the arcuate configuration during use.

In other embodiments one or more additional frame members may be provided to support a wind buffeting shield and maintain the proper shape and configuration during use. For example, the motorcycle 210 shown in FIG. 6 includes a wind buffeting shield 236 that is substantially rectangular in plan view. In this embodiment, an additional rigid frame member is provided near a rear of the gas tank 226 that extends substantially horizontally outwardly from the tank 226 and receives the rear portion of the wind buffeting shield 236. In this regard, the substantially rectangular (or any other desired configuration for that matter) can be maintained during use of the wind buffeting shield 236 even when constructed from a flexible material such as vinyl, leather, or similar.

In still other embodiments the wind buffeting shield can be constructed from a rigid or semi-rigid material such as polycarbonate, plexiglass, plastic, or other material, which can thus maintain its shape and configuration without the use of external frame members and/or internal frames of other reinforcing structures. For example, the wind buffeting shield 336 shown in FIG. 7 has a rounded (i.e., substantially semi-circular) configuration. In this embodiment, the wind buffeting shield 336 can mounted to the engine guard 330, motorcycle 310 frame, or other portion of the motorcycle 310 and maintains its shape and configuration during use due the inherent stiffness of the rigid or semi-rigid material.

Moreover, in some embodiments the wind buffeting shield may include additional flow restricting portions in order to restrict or prevent upward flowing air from reaching a rider during use. For example, the wind buffeting shield 436 shown in FIG. 8 includes a first flow restricting portion 437 and a second flow restricting portion 439. The first flow restricting portion 437 extends generally horizontally proximate a bottom of the gas tank 426, similar to the flow restricting portion 37 discussed in connection with FIGS. 1-4. The second flow restricting portion 439 extends at an angle with respect to the first flow restricting portion 437. In this embodiment, the second flow restricting portion 439 is generally upright and thus extends generally perpendicularly to the first flow restricting portion 437. However, in other embodiments the second flow restricting portion 439 may extend at an oblique angle with respect to the first flow restricting portion 437. In such embodiments the second flow restricting portion 439 provides an additional barrier to restrict or eliminate air flow towards a rider's torso and head, further reducing wind buffeting dure use of the motorcycle 410.

Moreover, in this embodiment the front coupling portion 438 attaches directly to the main frame or other rigid component of the motorcycle 410, and thus can be employed on a motorcycle 410 or other vehicle that does not include an engine guard or similar member. Still more, the wind buffeting shield 436 in this embodiment may be rigidly constructed, such as from plexiglass or similar material as discussed. Thus, one or more of the flow restricting portions 437, 439 may include an irregular outer perimeter configured to accommodate a rider's legs and provide tailored wind shielding benefits without the need of an internal frame or other structure to maintain the shape of the wind buffeting shield 436 during use. For example, in the depicted embodiment the first flow restricting portion 437 has a substantially irregular-hexagonal outer perimeter, and the second flow restricting portion 439 has a substantially irregular-pentagonal outer perimeter. Other shapes and configurations could be employed without departing from the scope of the disclosure.

The wind buffeting shields 36, 136, 236, 336, 436 and others described herein beneficially reduce air flow to a rider's head and torso area without requiring that a rider forego other comfort accessories such as a windshield or the like. That is, even when a rider wishes to employ a relatively large windshield susceptible to forming a vacuum pocket near the rider's upper torso and face, the wind buffeting shields restrict upward air flow from rushing in to such a pocket, which otherwise is known to cause wind buffeting and rider discomfort. Moreover, when formed from a flexible material such as vinyl fabric or the like, the wind buffeting shield is relatively lightweight and installs simply by pressing corresponding hook-and-loop fastening material together, and thus a user can easily install the guard for a road trip, and thereafter quickly remove and store the guard if it is desirable to do so for aesthetic or other purposes.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations.

I claim:

1. A vehicle wind buffeting shield comprising:

an air flow restricting portion; and at least one mounting member, wherein the at least one mounting member is configured to couple the air flow restricting portion proximate a bottom portion of a gas tank of a vehicle such that the air flow restricting portion projects generally horizontal and outwards from the vehicle and restricts upward air flow during operation of the vehicle, wherein the at least one mounting member includes a front coupling portion and a rear coupling portion, the front coupling portion being configured to couple to a first portion of the vehicle, the rear coupling portion being configured to couple to a second portion of the vehicle, wherein the first portion of the vehicle is an engine guard, and the second portion of the vehicle is the gas tank.

2. The vehicle wind buffeting shield of claim 1, wherein the air flow restricting portion is flexibly constructed.

3. The vehicle wind buffeting shield of claim 1, wherein the air flow restricting portion is rigidly constructed.

4. The vehicle wind buffeting shield of claim 1, further comprising a first fastener and a second fastener, wherein the first fastener is configured to couple a front portion of the vehicle wind buffeting shield to the engine guard, and wherein the second fastener is configured to couple a rear portion of the vehicle wind buffeting shield to the gas tank.

5. The vehicle wind buffeting shield of claim 4, wherein at least one of the first fastener and the second fastener includes a hook and loop fastening material.

6. The vehicle wind buffeting shield of claim 1, wherein the air flow restricting portion includes a top layer, a bottom layer, and a fastening material sandwiched between the top layer and the bottom layer, the fastening material configured to maintain the top layer proximate to the bottom layer during operation of the vehicle.

7. The vehicle wind buffeting shield of claim 1, further comprising another air flow restricting portion, wherein the another air flow restricting portion extends at an angle with respect to the air flow restricting portion.

8. The vehicle wind buffeting shield of claim 1, wherein the wind buffeting shield is generally triangular in plan view.

9. The vehicle wind buffeting shield of claim 1, wherein the wind buffeting shield includes a rounded outer edge.

10. A vehicle comprising:

a main frame;

a gas tank mounted to the main frame;

a front fork pivotably coupled to the main frame and including a pair of handlebars and a windshield coupled thereto; and a wind buffeting shield comprising:

a front coupling portion coupled to an engine guard;

a rear coupling portion coupled to the gas tank; and an air flow restricting portion extending between the front coupling portion and the rear coupling portion and configured to restrict upward air flow from entering a vacuum pocket proximate the windshield during operation of the vehicle.

11. The vehicle of claim 10, wherein the air flow restricting portion is flexibly constructed.

12. The vehicle of claim 10, wherein the air flow restricting portion is rigidly constructed.

13. The vehicle of claim 10, further comprising a first fastener and a second fastener, wherein the first fastener is configured to couple a front portion of the vehicle wind buffeting shield to the rigid component, and wherein the second fastener is configured to couple a rear portion of the vehicle wind buffeting shield to the gas tank.

14. The vehicle of claim 10, wherein the wind buffeting shield further comprises another air flow restricting portion, wherein the another air flow restricting portion extends at an angle with respect to the air flow restricting portion.

15. The vehicle of claim 10, wherein the air flow restricting portion includes a top layer, a bottom layer, and a fastening material sandwiched between the top layer and the bottom layer, the fastening material configured to couple the wind buffeting shield to the rigid component and maintain the top layer proximate to the bottom layer during operation of the vehicle.

16. A method of diverting upward air flow during operation of a vehicle, the method comprising:

mounting a wind buffeting shield on a vehicle, wherein the vehicle includes:

a main frame;

a gas tank mounted to the main frame; and a front fork pivotably coupled to the main frame and including a pair of handlebars and a windshield coupled thereto;

wherein the wind buffeting shield includes:

a front coupling portion, the front coupling portion being configured to couple to a first portion of the vehicle, the first portion of the vehicle being an engine guard;

a rear coupling portion, the rear coupling portion being configured to couple to a second portion of the vehicle, the second portion of the vehicle being the gas tank; and an air flow restricting portion extending between the front coupling portion and the rear coupling portion and configured to restrict upward air flow from entering a vacuum pocket proximate the windshield during operation of the vehicle, and wherein mounting the wind buffeting shield on the vehicle includes:

coupling the front coupling portion to the engine guard; and coupling the rear coupling portion to the gas tank.

17. The method of claim 16, wherein the air flow restricting portion includes a top layer, a bottom layer, and a fastening material sandwiched between the top layer and the bottom layer, and wherein mounting the wind buffeting shield on the vehicle includes pressing the top layer to the bottom layer to thereby maintain the top layer proximate to the bottom layer during operation of the vehicle.

18. The method of claim 16, wherein the rear coupling portion includes a fastening material, and wherein mounting the wind buffeting shield on the vehicle includes pressing the fastening material against the gas tank.

* * * * *